July 2, 1968  R. E. MUELLER  3,390,595

INDEX MECHANISM

Filed June 27, 1966  2 Sheets-Sheet 1

INVENTOR.
Rene Ernst Mueller
BY Barry L. Clark
Robert W. Beart
His Att'ys

July 2, 1968  R. E. MUELLER  3,390,595
INDEX MECHANISM
Filed June 27, 1966  2 Sheets-Sheet 2
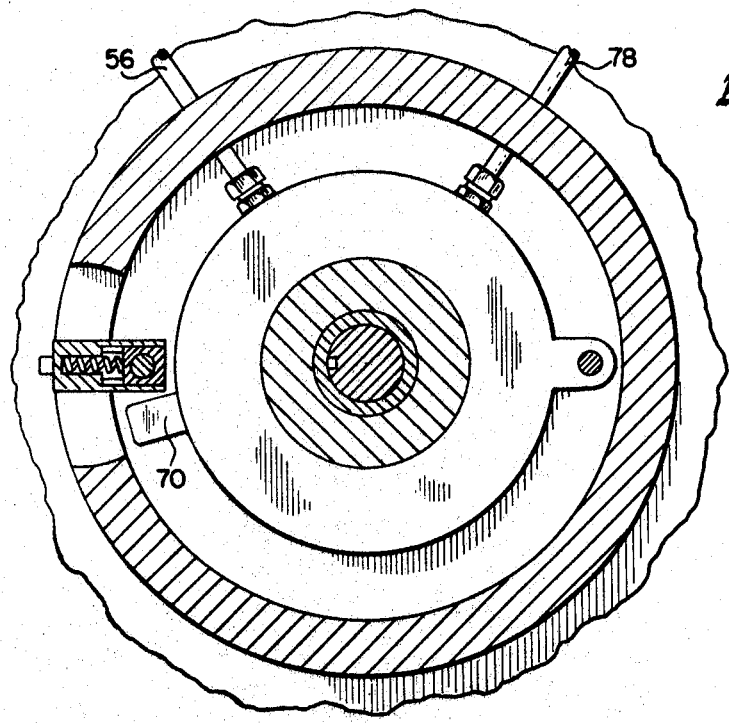
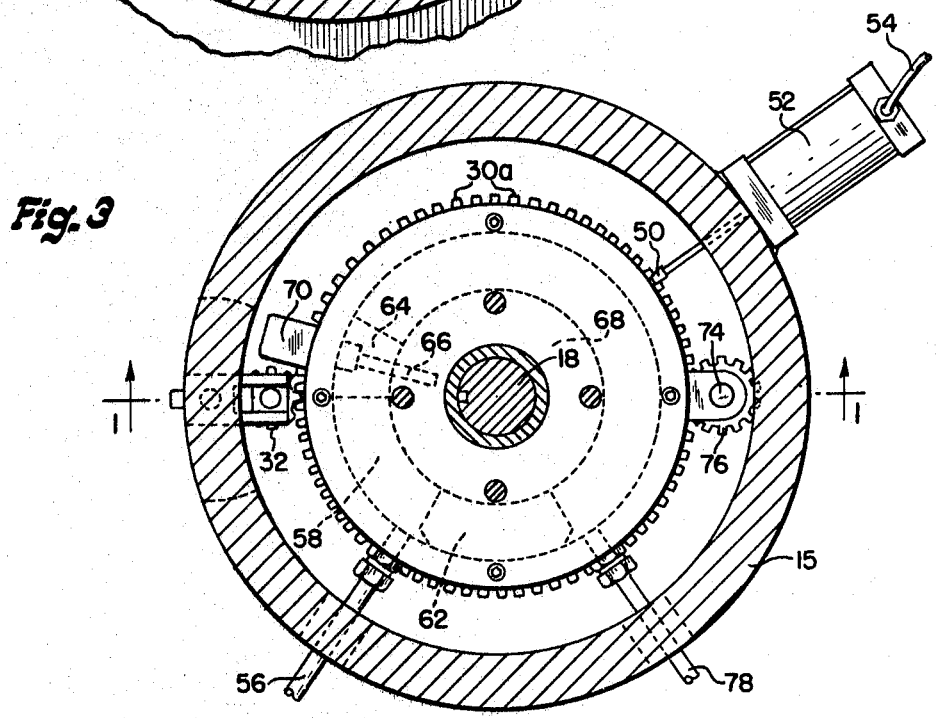
INVENTOR.
Rene Ernst Mueller
BY Barry L. Clark
Robert W. Beart
His Att'ys

United States Patent Office 3,390,595
Patented July 2, 1968

3,390,595
INDEX MECHANISM
Rene E. Mueller, Rosemont, Ill., assignor to Illinois Tool Works Inc., Chicago, Ill., a corporation of Delaware
Filed June 27, 1966, Ser. No. 560,751
9 Claims. (Cl. 74—815)

ABSTRACT OF THE DISCLOSURE

Indexing mechanism for indexing a rotatable member such as a hob in a predetermined number of equal increments per 360° of rotation which number is not evenly divisible into the number of index positions on an index member in the apparatus. The apparatus includes a first peripherally toothed index plate which can rotate free of the member to be indexed and a second index plate having the same number of teeth as the first plate but fixed for rotation with the member to be indexed. By placing a selected pair of axially aligned and fixed to each other pinions having different pitches in contact with the respective index gears it is possible to index the index gear attached to the member to be indexed so that it will be angularly indexed an amount which is different than the first index gear and divisible by a whole number into 360°.

---

This invention relates to apparatus for indexing and more particularly relates to apparatus for indexing a rotatable member in a plurality of equal increments which are not evenly divisible into the number of index positions on an index member in the apparatus.

Although the invention has broad application in rotational indexing, it will be described in relation to its use in indexing a hob mounted as a workpiece on a shaft in a hob grinding machine. In this use, the hob, whether new or used, is repeatedly indexed rotationally and reciprocated vertically past a grinding wheel for grinding the cutting face of the hob teeth along the length of successive hob flutes. It can be appreciated that extremely precise indexing is required in such an apparatus in order that the relative position of the teeth on the hob be maintained. Only in this way can a ground hob properly present its teeth successively when used for graduated controlled cutting of gear teeth.

In the prior art hob grinding apparatus on which this invention is an improvement, indexing is accomplished by the use of an index plate or gear having a plurality of index positions or teeth around its periphery. Stop means are associated with the index plate to cause the plate to index one or more teeth depending upon the number of flutes on the hob being ground. Inasmuch as the index plate is commonly fixed for rotation with the workpiece carrying shaft, it is obvious that such an index plate cannot be used unless the number of flutes to be ground is evenly divisible into the number of index positions or stops on the index plate or gear. A change in the number of machining operations to be performed on the workpiece to a number which is not exactly divisible into the number of index gear teeth necessitates changing the indexing plate or gear for one which has the desired number of teeth. To illustrate this problem, it is obvious that an index plate having 360 gear teeth which is used for indexing in the ordinary range of from two to twenty increments to permit an equal number of grinding operations on a hob would provide index stops for only twelve positions, these being 2, 3, 4, 5, 6, 8, 9, 10, 12, 15, 18 and 20 increments. Reducing the illustration to a more feasible number of gear teeth on the index plate such as one having 60 teeth, it can be seen that for the same indexing range there would be only nine indexing positions, namely 2, 3, 4, 5, 6, 10, 12, 15, and 20. For all other numbers in the range from 2 to 20, it has been necessary to provide additional index plates which must be installed separately. Because the index plate is commonly a part of the total drive mechanism, it is relatively inaccessible and requires a disproportionately large amount of time to be replaced with another plate having a different number of index positions or gear teeth. Furthermore, since indexing is a precision operation, it is necessary that the index plate or gear be precision made. The stocking of all the index plates necessary to permit the grinding of various sizes of hobs would necessitate a considerable investment of capital. Accordingly, it is an object of this invention to provide an apparatus which employs only one indexing plate or gear from which a wide range of different indexed rotational positions can be obtained.

A further object of this invention is to provide an apparatus for indexing which permits the number of increments of rotation of a workpiece carrying member to be changed with a minimum expenditure of time, effort and expense.

Another object of the invention is to provide an apparatus for indexing in which backlash is at a minimum.

An additional object of the invention is to provide an apparatus which permits a set of gears to be changed extremely quickly.

Another object of the invention is to provide an apparatus in which two gears having identical numbers of teeth can be driven at slightly different rates of rotation by being placed in mesh with a pair of pinions which are fixed to one another and which have different numbers of teeth but a common center to center distance.

A still further object of the invention is to provide a series of equations for determining the proper combination of pinion gears to be chosen to drive one rotating member at a desired rate relative to another.

Utilizing the apparatus of the present invention, extremely accurate indexing of a workpiece is possible. With the apparatus it is possible to index a member a predetermined number of increments during a single rotation of the member even though an index plate in the apparatus which assures even spacing of the increments has a number of index positions which is not exactly divisible by the number of increments of rotation desired. To provide the desired indexing, a second indexing or transport plate having a predetermined number of index positions equal to that of the first indexing plate is mounted coaxially with the member to be indexed and for fixed rotation therewith. In order to drive the first and second indexing plates at a differential rate, a power transmission means is provided. The transmission means includes a pair of members which rotate at the same angular velocity but have different numbers of drivable portions thereon for engaging and driving the first and second index plates at a differential speed. Although it is contemplated that the various driving and driven elements of the apparatus will comprise gearing, it is obvious that other equivalent drive means could be used.

The novel features that are characteristic of the invention are set forth with particularity in the appended claims. An understanding of the invention, from a structural and functional standpoint, together with additional objects and advantages thereof, will be best understood by reading the following description in conjunction with the accompanying drawings, wherein:

FIG. 3 is a sectional view taken substantially in the plane of the line 1—1 of FIG. 1;

FIG. 4 is a sectional view taken substantially in the plane of the line 4—4 of FIG. 1.

Figure 1:
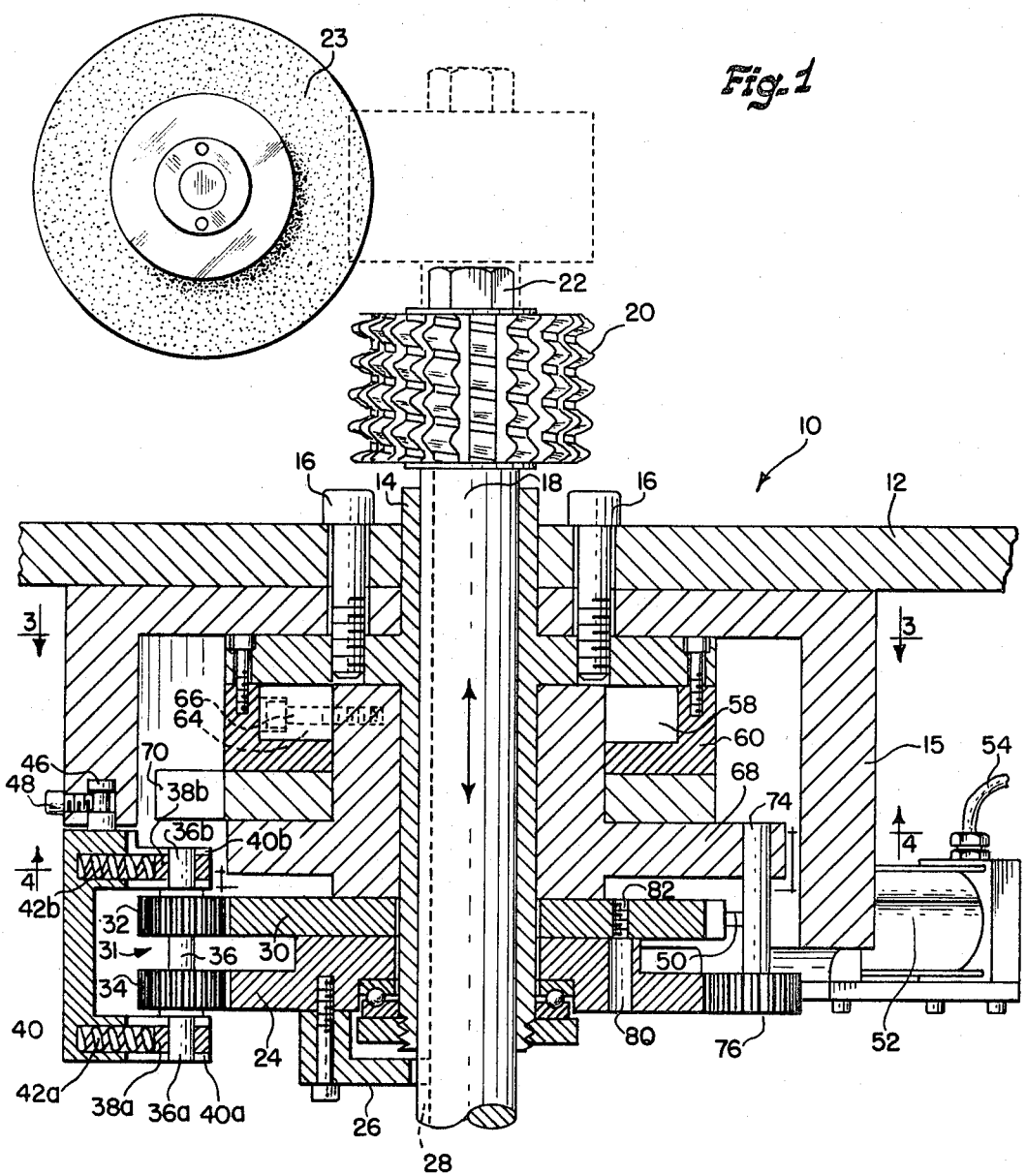
FIG. 1 is a side view in cross section taken on line 3—3 of FIG. 3 of the indexing apparatus of the present invention.

FIG. 1 shows a preferred embodiment of the invention wherein a frame 10 of a hob grinding machine includes a mounting plate 12 to which a support member or bracket 15 and a shaft support bearing 14 is attached by means of screws 16. A shaft 18 is adapted to reciprocate vertically within the bearing 14 by apparatus not shown, to cause a workpiece, shown in the drawing as a hob 20 held on the shaft by a nut 22, to reciprocate up and down between the dotted line and solid positions shown in FIG. 1 so that the teeth on the hob 20 may be sharpened by the rotating grinding wheel 23.

Inasmuch as the hob to be sharpened contains a predetermined number of flutes which are exactly spaced apart around its periphery, it is necessary that the shaft 18 be indexed an exact increment of angular rotation for each pass of the hob 20 past the grinding wheel 23. The indexing movement is transmitted directly to shaft 18 by a transport or secondary indexing gear 24 which is keyed by means of element 26 attached thereto to a keyway or spline 28 in shaft 18. The exact increment of rotation given to secondary indexing gear 24 is derived from a precision index gear or plate 30 which is coaxial with transport gear 24 but freely mounted for rotation about shaft support bearing 14. The index gear 30 is made so that the distance between each indexing portion or tooth 30a is exactly the same. When the index gear 30 is indexed one or more tooth spaces, a pinion gear means 31 including a first pinion 32 engaged therewith will be rotated. It can be seen in FIG. 1 that first pinion 32 and a second pinion 34 are mounted on shaft 36. The pinion gears 32, 34 are either integrally formed with the shaft 36 or are otherwise fixed thereto. The ends 36a, 36b of shaft 36 are mounted in movable bushings 38a, 38b slidable in grooves in arms 40a, 40b of bracket 40. Biasing springs 42a, 42b bear against the ends of the bushings 38a, 38b to press the pinions 32, 34 against the gears 30, 24. This spring loading of the pairs of engaging gears insures that there will be no backlash in the gearing to prevent the accurate transfer of the rotation of index gear 30 to transport gear 24.

To permit the pinion gears to be quickly changed without disassembling the entire machine, the bracket 40 is mounted for rotary adjustable movement relative to support member 15 by means of bracket support shaft 46 which is locked to member 15 by a set screw 48. The adjustable mounting permits the bracket arms 40a, 40b to be swung clear of the index and transport gears so that the pinion gear assembly 31 can be easily slid out of the slots in arms 40a, 40b and replaced by a pinion assembly having a different diameter and a different number of teeth. Although the springs 42a, 42b have been noted as serving to hold the pinions 32, 34 against the index and transport gears to prevent backlash, they also permit a rather large range of diameters of pinion gears to be mounted in arms 40a, 40b.

To initiate an indexing operation, an index or locking pin 50 mounted on the end of a piston moved by fluid motor 52 is released from contact with index gear 30 by controlling the supply of fluid in fluid line 54. Once the index pin 50 is released, a supply of fluid from fluid line 56 passes into piston chamber or "cylinder" 58 formed by piston chamber housing 60 and shaft support bearing 14. Since one end of the piston chamber 58 is sealed closed by a fixed stop 62, the fluid from line 56 forces piston 64 mounted for movement in piston chamber 58 to rotate clockwise from stop 62 as seen in FIG. 3. The piston 64 is mounted by means of a piston support member 66 to rotatable index power member 68. Depending upon the angular extent of indexing movement desired, a stop member 70 is adjustably rotated to one of several positions of indexing movement obtainable with the apparatus and locked for movement with index power member 68. When piston 64 has been rotated the proper distance for a given increment of indexing, an electrical switch (not shown) on the support member 15 will be engaged by the stop 70 to cause the supply of fluid passing into the piston chamber 58 from line 56 to be cut off, limiting the degree of rotation of index power member 68. Index power member 68 has a pull gear shaft 74 mounted therein. A pull gear 76 is mounted on the end of pull gear shaft 74 with a conventional one way clutch so as to be freely rotatable relative to shaft 74 in one direction of movement and to be fixed against rotation in the other direction of movement. When index power member 68 is rotated by piston 64 in the clockwise direction shown in FIG. 3, the pull gear 76 mounted thereon is locked against rotation and therefore carries transport gear 24 with it. When the movement of piston 64 stops, due to the actuation of the aforementioned switch, the fluid motor 52 will be actuated to cause the index or locking pin 50 to move back into engagement with teeth 30a on index gear 30 so as to precisely position the index gear and prevent further rotation during the grinding operation. After the index gear is locked by the index pin 50, fluid from fluid line 78 enters piston chamber 58 and drives the piston 64 back to its starting position adjacent fluid line 56. Inasmuch as pull gear 76 is free to rotate in this direction of movement, it will roll over the transport gear 24 without moving said gear. As the piston 64 reaches the end of its return stroke, a second electrical switch (not shown) is actuated to initiate the vertical reciprocation of shaft 18.

It has been noted earlier that the principal purpose of the invention is to permit a workpiece to be indexed to a plurality of equally spaced positions even though the number of positions desired is not divisible into the number of index positions on the index gear. To achieve this purpose, the apparatus utilizes pinion gears 32, 34 having different numbers of teeth. However, if it is desired to index a workpiece 20 in a number of increments which is divisible into the number of index positions or teeth 30a on the index gear 30, the numbers of teeth in pinions 32, 34 would be chosen to be equal. Alternatively, in the latter situation, the pinions 32, 34 could be removed from the bracket 40 and a screw placed in hole 80 in transport gear 24 and threaded into hole 82 in index gear 30 to lock the two gears together for positive rotation.

By grinding the teeth undersize on one of the pinions 32, 34 and oversize on the other, it is possible to have a different number of teeth on each of the two pinions while maintaining a common center distance between the axes of pinion set 31 and gears 30 and 24. Depending on whether the number of teeth on gear 34 is greater or lesser than the number of teeth on pinion 32 the amount of rotation of transport gear 24 will be greater or lesser than that of index gear 30. The numbers of teeth necessary on the pinions 32, 34 to achieve a desired number of index steps for a workpiece 20 can be derived from the following formulas where:

N equals the number of increments of indexing movement of the workpiece desired during one revolution;

Z equals the number of teeth in the index gear 30;

$Z_1$ equals the number of teeth in the first pinion 32;

$Z_2$ equals the number of teeth in the second pinion 34;

D equals the difference between the number of teeth in the index gear (Z) and the number of teeth (T) closest to the value of Z into which the number of increments N can be evenly divided.

The value of $Z_1$ and $Z_2$ can be determined from the equations:

(1) $\qquad Z/D = Z_1$ (2) $\qquad Z_2 = Z_1 + 1$ where D is larger than Z;

(3) $\qquad Z_2 = Z_1 - 1$ where D is smaller than Z.

Some examples utilizing the above equations where Z=60 are as follows.

Example 1

[Where desired number of flutes $N=13$]

Inasmuch as the number of teeth $Z=60$ in the index gear is not evenly divisible by the number of increments $N=13$, the number 13 is multiplied by the whole number which will result in a product T which is as close to the value of $Z=60$ as possible. Since the value of this product T is 65;

$$D=T-Z=65-60=5$$

Placing these values in Equation 1;

$$Z_1=\frac{Z}{D}=\frac{60}{5}=12 \text{ teeth}$$

Since the number $T=65$ is larger than the number $Z=60$, Equation 2 is used to determine the number of teeth in pinion gear 34;

$$Z_2=Z_1+1=12+1=13 \text{ teeth}$$

Example 2

[Where desired number of flutes $N=11$]

$$D=Z-T=60-55=5$$

$$Z_1=\frac{Z}{D}=\frac{60}{5}=12 \text{ teeth}$$

Since the number $T=55$ is less than the number $Z=60$, Equation 3 is used to determine the number of teeth in the pinion 34;

$$Z_2=Z_1-1=12-1=11 \text{ teeth}$$

Example 3

[Where desired number of flutes $N=14$]

$$D=Z-T=60-56=4$$

$$Z_1=\frac{Z}{D}=\frac{60}{4}=15 \text{ teeth}$$

$$Z_2=Z_1-1=15-1=14 \text{ teeth}$$

Figure 2:
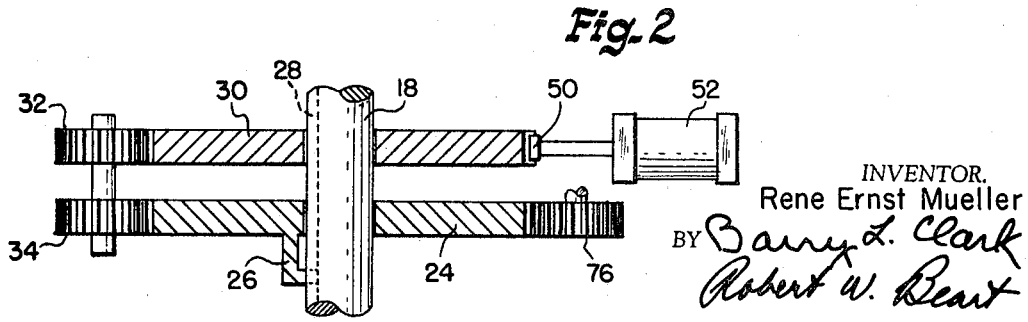
FIG. 2 is a diagrammatical representation of the gear arrangement shown in FIG. 1.

Although the invention, whereby a shaft and a workpiece thereon can be indexed a different amount than an index gear associated therewith has been described specifically in connection with FIG. 1, reference is made to FIG. 2 for a brief general description of the operation of the device. When index pin 50 is released from index gear 30, the transport or secondary index plate 24 may be rotated to an approximately final position by the pull gear 76. The rotary movement of transport gear 24 is transmitted to index gear 30 by means of pinions 34, 32 which have different numbers of teeth but which move together. Inasmuch as the index and transport gears 30 and 24 have identical numbers of teeth, it can be readily seen that gear 30 will be driven a greater or lesser amount than gear 24 dependent upon the numbers of teeth on pinions 32, 34. Once the index gear has been moved to its approximate final position by the movement of transport gear 24, the index pin 50 is moved back into contact with the index gear and causes a final alignment or positioning of the index gear 30 which is in turn transmitted back through gears 32, 34 and 24 to result in a final positioning of the shaft 18 which is mounted for non-rotative movement relative to transport gear 24.

From the foregoing description it will be readily apparent that the invention permits the range of indexing increments available from a single index gear to be quickly changed by merely loosening the set screw 48, pivoting bracket 40 away from the index gear 30, sliding out the pinion 31, replacing it with a new pinion, pivoting the bracket back to its initial position, and locking the set screw 48.

It is obvious that this procedure for changing the number of increments to which the workpiece can be indexed is far simpler than the procedure used prior to the present invention wherein the apparatus had to be completely disassembled to remove the index plate 30 and replace it with one having a different number of teeth suitable for the spacing increment desired. Not only does the present invention result in a large savings in time when spacing increments are changed but it also eliminates the necessity of stocking a plurality of extremely accurate and therefore expensive index plates 30. Although various numbers of pinions 31 would have to be kept on hand to be used with the apparatus, the cost of such pinions would be much less than that of the index gear 30.

What is claimed is:

1. An index mechanism for indexing a member a desired predetermined whole number of increments per single revolution of the member;
   first indexing means including a first freely rotatable index plate having a predetermined number of index positions, said number of index positions not being evenly divisible by said desired whole number of increments of said member;
   second indexing means including a second index plate mounted for fixed rotatable movement with said member and having a predetermined number of index positions equal to the number on said first index plate;
   power transmission means including first and second members adapted to rotate at the same rate, said first and second members having different numbers of drivable portions thereon, said drivable portions being in drivable engagement with said first and second index plates respectively and adapted to drive said second index plate at a different rate of angular rotation than said first index plate;
   whereby, said second index plate and said first mentioned member are indexed said predetermined whole number of increments while being rotated through 360°, while said first index plate is rotated through the same number of increments but has an angle of rotation different than 360°.

2. An indexing mechanism for indexing a shaft a desired predetermined whole number of increments during a single revolution of the shaft;
   indexing means including an index gear having a predetermined number of teeth which is not evenly divisible by said whole number of increments, said index gear being freely rotatably mounted coaxially relative to said shaft;
   transport means including a transport gear having the same number of teeth as said index gear, said transport gear being mounted coaxial with said shaft for fixed rotatable movement therewith;
   first and second pinion gears fixedly and coaxially mounted relative to one another and having an axis parallel to the axis of said shaft;
   said first and second pinion gears having teeth in engagement with said index and transport gears respectively;
   said first pinion gear having a number of teeth different from said second pinion gear;
   said difference in the number of teeth on said first and second pinion gears causing said transport gear to rotate during each indexing increment through an angle different from the angle through which the index gear rotates when it is indexed a given number of teeth;
   whereby indexing of said index gear a number of times equal to said whole number of increments through the angle included by said given number of teeth will cause said transport gear and shaft to be indexed through one complete revolution.

3. The indexing mechanism of claim 2 wherein the number of teeth on said first pinion gear differs by one from the number of teeth on the second pinion gear.

4. The indexing mechanism of claim 2 and further including:

means for rotating said transport gear to an initial position approximating a desired increment of rotation thereof; and shiftable locking means engageable with said index gear after said index gear is initially positioned by rotation of said transport gear to lock said index gear and determine the final position of said index and transport gears and said shaft.

5. The indexing mechanism of claim 4 wherein said shiftable locking means comprises a locking pin movable by a piston and cylinder into a position between a pair of adjacent teeth on said index gear, said pin being adapted to engage surfaces of each of said teeth to cause said teeth to rotate said index gear into a position of final alignment.

6. The indexing mechanism of claim 2 and further including pivoted bracket means having a pair of slotted arms for mounting said first and second pinion gears, said pivoted bracket means permitting the pinion gears mounted in said slotted arms to be quickly replaced by pivoting the arms so as to move the pinions out of contact with the index gears.

7. The indexing means of claim 6 wherein each of said arms include movable bearings permitting various diameter first and second pinion means to be held in contact with said index and transport gear means.

8. The indexing means of claim 6 and further including biasing means located in each of said pair of slotted arms, said biasing means holding said first and second pinion gears in contact wtih said index and transport gears to prevent backlash between said gears.

9. The indexing mechanism of claim 2 wherein when N is the number of increments of indexing movement of the shaft desired during one revolution, Z is the number of teeth in the index gear, $Z_1$ is the number of teeth in the first pinion, $Z_2$ is the number of teeth in the second pinion, and D is the difference between Z and the number of teeth T closest to Z into which the number of increments N can be evenly divided, the value of $Z_1$ and $Z_2$ can be determined from the equations: $Z/D=Z_1$, $Z_2=Z_1+1$ where D is larger than Z, and $Z_2=Z_1-1$ where D is smaller than Z.

References Cited

UNITED STATES PATENTS

| | | | |
|---|---|---|---|
| 1,001,484 | 8/1911 | Weitershausen | 74—813 X |
| 2,259,948 | 10/1941 | Bullard | 74—817 X |
| 3,067,633 | 12/1962 | Lehman | 74—815 |
| 3,146,640 | 9/1964 | Moncrieff | 74—827 X |

FRED C. MATTERN, JR., *Primary Examiner.*

J. S. CORNETTE, W. S. RATLIFF, *Assistant Examiners.*